Oct. 22, 1935.  I. B. WHITCOMB  2,018,587
NOVELTY PICTURE
Filed June 21, 1934
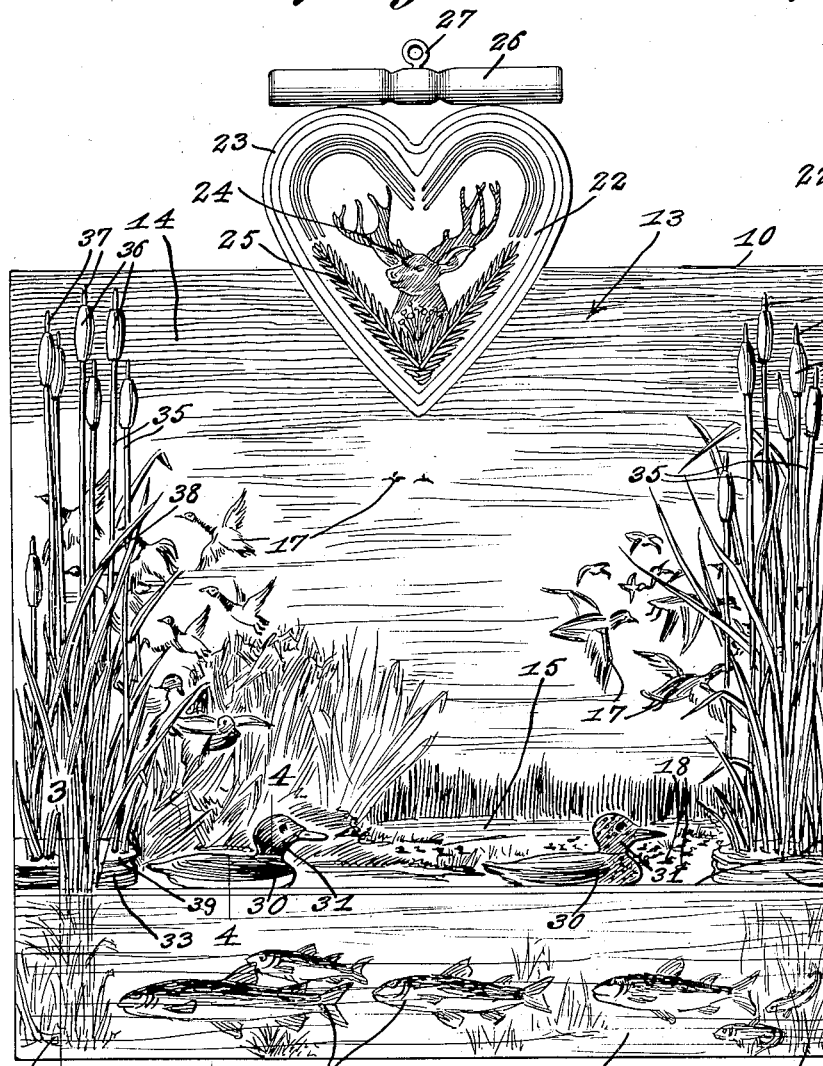
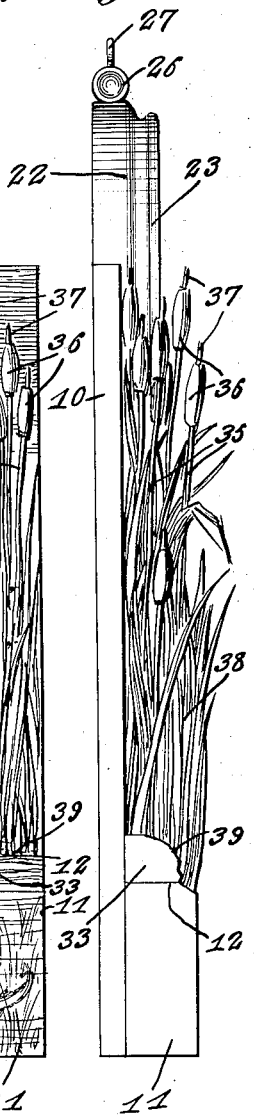
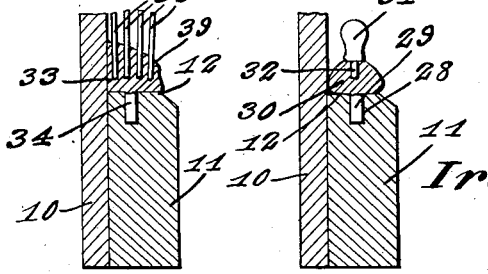
Ira B. Whitcomb, INVENTOR
BY Victor J. Evans & Co.
ATTORNEY Patented Oct. 22, 1935

2,018,587

UNITED STATES PATENT OFFICE 2,018,587

NOVELTY PICTURE

Ira B. Whitcomb, Dorris, Calif.

Application June 21, 1934, Serial No. 731,752

1 Claim. (Cl. 41—34)

The invention relates to a novelty article and more especially to a novelty picture.

The primary object of the invention is the provision of a picture of this character, wherein a scenic effect is present having realistic characteristics in that artificial plants, sod or turf and images simulating swimming ducks or the like are in bold relief and such plants having the appearance of a natural growth to give the touch of nature to the picture.

Another object of the invention is the provision of a picture of this character, wherein the make-up of the same is novel in kind and gives to an observer a realistic appearance and a picturesque character.

A further object of the invention is the provision of a picture of this character, wherein the effect of the same can be altered or changed by reason of adjustability of the objects or images as arranged in association with the scenic display and through transposition the effect will be different, the general make-up and arrangement being novel in entirety.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a front elevation of a picture constructed in accordance with the invention.

Figure 2 is a side edge view thereof.

Figure 3 is a fragmentary sectional view on the line 3—3 of Figure 1.

Figure 4 is fragmentary sectional view on the line 4—4 of Figure 1.

Similar reference characters indicate corresponding parts throughout the several views in the drawing.

Referring to the drawing in detail, the picture comprises a flat body 10, preferably made from suitable semi-transparent material and of the required size and shape to afford a panel or plaque and at the lower front portion of this body is a strip 11, the same being disposed crosswise and at the lowermost edge of said body to provide a ledge 12 for a purpose presently described. Upon the front or outer face of the body 10 is arranged a scene 13, the same being created by painting, and in this instance is indicative of sky 14, a pond 15 and plant habitation, while the sky 14 and the pond 15 have animal, fowl or bird life representations, in this instance, the representations being the flying and swimming ducks 17 and 18, respectively. The strip 11 at its exposed face is painted to effect the representation of water 19 and fish 20 swimming, while in addition thereto are the representations of water plants 21, and thus the water representation 19 has the effect of a continuity of the pond 15.

Partly extended from the top edge of the body 10, preferably at the median, is a heart symbol 22, this at its front being cut into to provide a marginal beam 23 indicative of a frame of heart shape, while at the center of each symbol, on the outer side thereof, is the representation of a deer 24, this being in cameo form, while beneath the representation 24 is cut decorative carving 25. Superimposed upon the symbol 22 is a cross bar 26 having fitted therein at its center an eye 27 for hanging purposes. Provided in the ledge 12 are suitable sockets 28 for accommodating removable pins 29 for detachable mountings upon said ledge, for example, duck images 30, each having a removable head 31 which is held in place by a pin 32 and such head 31 can also be adjusted to vary the image profile. It is, of course, understood that any number of such images may be fitted upon the ledge 12 and these images, in this instance, have the appearance of swimming in the pond 15. The other mounts are the turf representations 33, each being removably held by a pin 34 alike to the pin 29, while fitted within each turf representation 32 are the stems 35 of cat-tail plants, which stems are preferably made from wood and carry removable blooms or heads 36 indicative of cat-tails, they having the tassels 37, the blooms or heads 36 being preferably made from cork, while the tassels are made from the upper smaller ends of feather quills. Additionally, the turf representations 33, which are in block form, carry artificial plant blades 38, these being trained or bent to give natural growth characteristics thereto and the turf representations 33 being covered with artificial sod 39, thus through such instrumentalities the picture has present realistic characteristics and nature's creations.

It is, of course, understood that the composite make-up of the picture as to the scene and plant arrangement may be varied and likewise as to image appearance.

The cat-tails and the plant blades, as well as the images, are painted congruous with their kind and varnish is used throughout the exposed portion of the picture and associated parts for maximum wear and finish.

What is claimed is:

A picture of the kind described comprising a panel having scenic indicia on the outer face thereof, a ledge carried by said panel and having scenic indicia at its outer face effecting the continuity of the indicia of said panel, the ledge being provided with sockets opening through its top and images removably and changeably seated upon said ledge and having pins selectively and removably engaged in said sockets.

IRA B. WHITCOMB.